(12) United States Patent
Van Leeuwen et al.

(10) Patent No.: US 12,258,479 B2
(45) Date of Patent: Mar. 25, 2025

(54) METHOD FOR PRINTING

(71) Applicant: Canon Production Printing Holding B.V., Venlo (NL)

(72) Inventors: Oscar Van Leeuwen, Venlo (NL); Robin X. E. Willemse, Venlo (NL); Mea A. H. Versleijen, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 444 days.

(21) Appl. No.: 17/382,986

(22) Filed: Jul. 22, 2021

(65) Prior Publication Data

US 2021/0348007 A1 Nov. 11, 2021

Related U.S. Application Data

(63) Continuation of application No. PCT/EP2020/051875, filed on Jan. 27, 2020.

(30) Foreign Application Priority Data

Jan. 30, 2019 (EP) ..................................... 19154554
Apr. 15, 2019 (EP) ..................................... 19169334

(51) Int. Cl.
| | |
|---|---|
| *C09D 11/101* | (2014.01) |
| *B41M 5/00* | (2006.01) |
| *B41M 7/00* | (2006.01) |
| *C09D 11/107* | (2014.01) |
| *C09D 11/38* | (2014.01) |

(52) U.S. Cl.
CPC ......... *C09D 11/101* (2013.01); *B41M 5/0047* (2013.01); *B41M 7/0081* (2013.01); *C09D 11/107* (2013.01); *C09D 11/38* (2013.01)

(58) Field of Classification Search
CPC ..... C09D 11/101; C09D 11/107; C09D 11/38; C09D 11/08; C09D 11/40; B41M 5/0047; B41M 7/0081

See application file for complete search history.

(56) References Cited

U.S. PATENT DOCUMENTS

| | | | |
|---|---|---|---|
| 2017/0342293 A1* | 11/2017 | Thijs | ...................... C09D 11/54 |
| 2018/0127606 A1 | 5/2018 | Illsley | |
| 2019/0085188 A1 | 3/2019 | Hall et al. | |
| 2019/0085190 A1 | 3/2019 | De Meutter | |
| 2019/0106583 A1 | 4/2019 | Johansson et al. | |

FOREIGN PATENT DOCUMENTS

| | | |
|---|---|---|
| EP | 3 222 684 A1 | 9/2017 |
| EP | 3 292 174 A1 | 3/2018 |
| EP | 3 447 097 A1 | 2/2019 |
| JP | 2010-165038 A | 7/2010 |
| JP | 2016-69571 A | 5/2016 |
| JP | 2016-69580 A | 5/2016 |
| WO | WO 2017/182638 A1 | 10/2017 |

OTHER PUBLICATIONS

Machine English translation of CN108884342, De Meutter (Year: 2018).*
European Search Report issued in EP 19 16 9334, dated Sep. 3, 2019.
International Search Report (PCT/ISA/210) issued in PCT/EP2020/051875, dated Apr. 28, 2020.
Written Opinion of the International Searching Authority (PCT/ISA/237) issued in PCT/EP2020/051875, dated Apr. 28, 2020.

* cited by examiner

*Primary Examiner* — Jessica M Roswell
(74) *Attorney, Agent, or Firm* — Birch, Stewart, Kolasch & Birch, LLP

(57) ABSTRACT

The present invention relates to a method for printing on an adhesive medium. The present invention further relates to a printed product. In addition, the present invention relates to a method for applying an image onto an object. The present invention also relates to a radiation-curable ink composition.

13 Claims, 1 Drawing Sheet

METHOD FOR PRINTING

CROSS REFERENCE TO RELATED APPLICATIONS

This application is a Continuation of PCT International Application No. PCT/EP2020/051875, filed on Jan. 27, 2020, which claims priority under 35 U.S.C. 119 (a) to patent application Ser. No. 19/154,554.0, filed in Europe on Jan. 30, 2019 and patent application Ser. No. 19/169,334.0, filed in Europe on Apr. 15, 2019, all of which are hereby expressly incorporated by reference into the present application.

The present invention relates to a radiation-curable ink composition and to a method for preparing such ink composition. The present invention further relates to method for printing on an adhesive medium. The present invention also relates to a printed product. In addition, the present invention relates to a method for applying an image onto an object.

BACKGROUND OF THE INVENTION

Radiation-curable ink compositions are known in the art. These ink compositions comprise one or more radiation curable components. These ink composition can be used to apply an image onto a recording medium, for example using an ink jet printer. Radiation-curable ink compositions have advantages over other types of ink compositions, such as aqueous ink compositions or solvent-based ink compositions. Radiation-curable ink compositions can form robust images having excellent color fastness, even if the printed images are used in outdoor applications. An example of an outdoor-application is advertisement, such as advertisement on buses, cars or trains. The print may directly be applied onto an object, but for practical reasons, the print is generally first applied onto an intermediate medium, such as an adhesive medium. An example of an adhesive medium is a self-adhesive vinyl medium. The adhesive medium may be applied with an image by printing the image on the adhesive medium. This medium provided with the image may then later be applied onto an object, for example a bus.

The object to be provided with the image may have a size exceeding the size of the intermediate medium. Therefore, in practice, often a plurality of intermediate media is applied, each intermediate being provided with a sub-image of the image to be provided on the object. The sub-images provided on the intermediate media may partially overlap, to prevent non-printed sections on the object. The intermediate members may be applied onto the object, such that they partially overlap according to the image provided on the respective intermediate members. The overlapping parts may be removed in a later step, resulting in an object provided with an image, wherein the intermediate media applied onto the object do no longer overlap.

However, when applying the intermediate media in a partially overlapping way, the ink layer or a part thereof applied onto an intermediate member partially covered by another intermediate medium, may transfer to that other intermediate medium. The phenomenon of pigment transfer between overlapping media is called glue-interaction. The occurrence of glue interaction is unwanted, as it results in reduced Optical Density or even damage of the print.

It is therefore an object of the present invention to provide a method for applying an image onto a recording medium, wherein the transfer of pigment is reduced.

SUMMARY OF THE INVENTION

The object of the invention is achieved in a radiation-curable ink composition, the radiation-curable ink composition comprising at least a radiation-curable medium, a gelling agent and an amine acrylate oligomer, the amine acrylate oligomer being a reaction product between 2-aminoethanol and a diacrylate, the gellant being a condensation product of a first reactant and a second reactant, wherein the first reactant is a compound A comprising at least 3 first functional groups, and wherein the second reactant comprises at least one compound B, wherein the at least one compound B comprises a second functional group, wherein the first functional group is a first group selected from a hydroxyl functional group and a carboxylic acid functional group and the second functional group is a second group selected from a hydroxyl functional group and a carboxylic acid functional group, wherein the first functional group is different from the second functional group.

Radiation-Curable Medium

The radiation curable ink composition may comprise a radiation-curable medium. The radiation-curable medium may comprise at least one radiation-curable component. A radiation-curable component is a component that may react (e.g. polymerize) under influence of suitable radiation, such as electromagnetic radiation, e.g. ultraviolet (UV) radiation. Examples of radiation-curable components are epoxides and (meth)acrylates. (Meth-)acrylates may comprise one or more reactive groups for forming an acrylate polymer. The radiation-curable medium may comprise one type of radiation curable compound or alternatively, the radiation-curable medium may comprise a mixture of radiation-curable compounds.

The radiation-curable medium may further comprise at least one inhibitor. An inhibitor is a component that prevents (inhibits) unwanted polymerization of the radiation-curable compound. Inhibitors may be added to the radiation curable inkjet ink composition to increase the shelf life of the ink composition.

The radiation-curable medium may further comprise at least one photo initiator. A photo initiator is a component that improves the efficiency of curing; i.e. increases the polymerization rate when the ink composition is irradiated with suitable radiation, such as UV radiation.

The radiation-curable medium may further comprise a solvent, such as water or an organic solvent. The solvent may be added to the radiation curable medium to tune ink properties, such as viscosity.

Further, additional components may be added to the radiation curable medium. For example, the radiation curable medium may comprise surfactants, antibacterial components and anti-fungi components.

Colorant

The radiation curable ink composition may further comprise a colorant, such as a pigment, a dye or a mixture thereof. Further, the radiation curable inkjet ink composition may comprise a mixture of dyes and/or a mixture of pigments. The colorant may provide the ink composition with a predetermined color.

Gellant

Preferably, the radiation-curable ink composition comprises a gellant. The gellant comprises a fatty acid ester.

The gellant may comprise a condensation product of a first reactant and a second reactant, wherein the first reactant is a compound A comprising at least 3 first functional groups, and wherein the second reactant comprises at least one compound B, wherein the at least one compound B comprises a second functional group, wherein the first functional group is a first group selected from a hydroxyl functional group and a carboxylic acid functional group and the second functional group is a second group selected from a hydroxyl functional group and a carboxylic acid functional group, wherein the first functional group is different from the second functional group.

Hence, the ester compound may consist essentially of a condensation product of a first reactant and a second reactant, wherein the first reactant is a compound A comprising at least 3 hydroxyl functional group functional groups and wherein the second reactant comprises at least one compound B, wherein the at least one compound B comprises a carboxylic functional group. Alternatively, the ester compound may consist essentially of a condensation product of a first reactant and a second reactant, wherein the first reactant is a compound A comprising at least 3 carboxylic acid functional groups and wherein the second reactant comprises at least one compound B, wherein the at least one compound B comprises a hydroxyl functional group.

Preferably, compound B comprises only one functional group.

The ester compound formed by reacting the first reactant and the second reactant may be a nonlinear ester compound. The ester compound may comprise at least three ester groups. The ester compound may provide the radiation curable inkjet ink composition with gelling properties.

In an embodiment, the compound B is a compound according to formula I, wherein R is an alkyl group, an aryl group or an alkylaryl group, wherein R is a group having 5-30 carbon atoms.

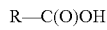

R—C(O)OH                        formula I

Compounds according to formula I are suitable to form ester compounds in accordance with the present invention. The properties of the ester compound may be influenced by the choice of the functional group R. The nature of the R group may for example influence the melting point of the ester compound and the rate of diffusion of the ester compound in the inkjet ink composition. R may be an alkyl group, an aryl group or an alkylaryl group. When the functional group R comprises an aromatic unit, then pi-pi-interaction may occur. Pi-pi interaction may assist in forming the intermolecular network upon cooling of the ink composition comprising the ester compound, which may be beneficial for the increase in viscosity of the ink composition when cooling down.

The functional group R may be a group comprising 5-40 carbon atoms, preferably 10-25. When the functional group R comprises less than 5 carbon atoms, the ester compound may not show gelling behavior at printing conditions. When the functional group R comprises more than 40 carbon atoms, then the ester compound may not be fluid at jetting conditions, which may hamper the jetting of the inkjet ink composition. The ester compound may comprise only one type of functional group R. Alternatively, the ester compound may comprise a plurality of different R functional groups.

In a further embodiment, compound B is a fatty acid. Fatty acids are compounds comprising a carboxylic acid group and a long aliphatic chain, which is either saturated or unsaturated. Most naturally occurring fatty acids have an unbranched chain of an even number of carbon atoms. However, fatty acids having a branched chain and/or an odd number of carbon atoms may also be used as gellant in accordance with the present invention. Examples of fatty acids are octanoic acid, decanoic acid, dodecanoic acid, tetradecanoic acid, hexadecanoic acid (palmitic acid), octadecanoic acid (stearic acid), eicosanoic acid (arachidic acid) and dodecanoic acid.

Amine Acrylate Oligomer

The ink composition may comprise an amine acrylate oligomer. The amine acrylate oligomer may be a reaction product between 2-aminoethanol and a diacrylate. The amine acrylate oligomer may have a molecular weight $M_w$ in the range of 300 g/mole-1200 g/mole.

The amine acrylate may comprise free acrylate groups. The free acrylate groups may react with a radical component during a polymerization reaction. The polymerization reaction may be started in the curing step. Amine acrylate oligomers are believed to be capable of binding oxygen. As oxygen is known to inhibit polymerization reaction, especially at the surface of a print, the presence of an amine acrylate oligomer may improve the reactivity of the ink composition, thereby improving the degree of curing and preventing a tacky surface to be formed after curing.

The amine acrylate oligomer may preferably be present in an amount of from 3.0 wt % to 40 wt % based on the total weight of the radiation-curable inkjet ink composition. For example, the amine acrylate oligomer may be present in an amount of from 5.0 wt % to 25 wt % based on the total weight of the radiation-curable inkjet ink composition, for example in an amount of from 8.0 wt % to 15 wt % based on the total weight of the radiation-curable inkjet ink composition.

When using the ink composition according to the present invention, a printed product may be obtained that shows a decreased level of glue-interaction or does not show any glue-interaction at all.

In an embodiment, the diacrylate is a component according to the formula $H_2CCHC(O)O(CH_2)_nOC(O)CHCH_2$, wherein n is an integer in the range of 3-10.

In a further embodiment, the diacrylate is 1,6-hexanediacrylate. Thus, in this embodiment the amine acrylate oligomer is a reaction product of 2-aminoethanol and 1,6-hexanediacrylate. This amine acrylate oligomer is commercially available from Sartomer under the trade name CN3755™ and from IGM Resins under the trade name Photomer™ 4771 and Photomer™ 4775.

In an embodiment, the amine acrylate oligomer comprises at least one hydroxyl group. Optionally, the amine acrylate oligomer may comprise a plurality of hydroxyl groups.

In an embodiment, the gellant is present in an amount of 0.05 wt %-4.0 wt % based on the total weight of the radiation-curable inkjet ink composition. For example, the gellant may be present in an amount of 0.1 wt %-3.0 wt % based on the total weight of the radiation-curable inkjet ink composition, such as from 0.2 wt %-2.0 wt % based on the total weight of the radiation-curable inkjet ink composition.

In case the gellant is present in an amount of less than 0.10 wt %, based on the total weight of the radiation-curable inkjet ink composition, then insufficient gelling of the ink may take place upon applying the ink onto a recording medium. Insufficient gelling may result in print artefacts, such as color bleeding. In case the gellant is present in an amount of more than 4.0 wt %, then the ink may gel too strong upon application onto a recording medium, resulting in decreased print quality.

In an embodiment, the gellant is a fatty acid ester obtainable by a condensation reaction between a fatty acid and a component selected from the group consisting of pentaerythritol, cyclodextrine, glycerol, dipentaerythritol, 2-(hydroxymethyl)-2-methylpropane-1,3-diol, 2-ethyl-2-(hydroxymethyl)propane-1,3-diol, 2-(hydroxymethyl)propane- 1,3-diol, trimethylolethane, trimethylolpropane, trimethylolbutane and tri methylolpentane.

These compounds are compounds comprising at least 3 hydroxyl functional groups. When reacted with an acid, ester compounds can be formed.

Esters obtainable by reacting a fatty acid with a compound A selected from the above listed group may be esters having a branched structure (i.e. non-linear esters). Without wanting to be bound to any theory, it is believed that a branched structure may decrease the tendency of the ester compound to crystallize when cooling down. Methods for synthesizing ester compounds starting from a compound comprising a plurality of hydroxyl functional groups and a compound comprising a carboxylic acid group are known in the art.

In a further embodiment, the gellant is a fatty acid ester of pentaerythritol.

Fatty acids are suitable for forming esters, when reacted with a compound comprising a hydroxyl functional group. The fatty acids may be saturated or non-saturated fatty acids. Non-saturated fatty acids may be monounsaturated fatty acids or polyunsaturated fatty acids. Non-saturated fatty acids comprise an alkene functional group. Upon curing of the ink, the alkene functional group may react and the ester compound may be incorporated in the network formed by the radiation-curable component. Preferably, the fatty acid is a saturated fatty acid.

When the compound B is a fatty acid, no so-called blooming of the ink may occur. Blooming is an unwanted phenomenon that may occur in ink composition, such as radiation-curable ink composition comprising a gelling agent. After being applied onto a recording medium, a gelling agent present in the ink may cool down and may solidify, thereby forming a three-dimensional network that increases the viscosity of the ink. However, in the course of time, the gelling agent may migrate to the surface of the ink layer, which may result in matt print appearance. The phenomenon of decreased gloss due to migration of the gelling agent is known as "blooming". Without wanting to be bound to any theory, it is believed that by selecting compound B to be a fatty acid, an amorphous ester compound is obtained, that results in an ink composition that does not show blooming. Fatty acid esters of pentaerythritol may be suitably used as a gellant in a radiation-curable ink.

In a further embodiment, the ester compound is pentaerythritoltetrastearate. Pentaerythritoltetrastearate is an ester obtainable by reacting pentaerythritol and stearic acid. Stearic acid ($CH_3(CH_2)_{16}COOH$) is a fatty acid.

In an embodiment, the radiation-curable ink composition further comprises a radiation-curable component being an acrylate having two or more acrylate functional groups. An acrylate may undergo a polymerization reaction when irradiated by suitable radiation, such as UV radiation. Hence, a polyacrylate polymer may be formed when an inkjet ink composition comprising an acrylate is cured, thereby hardening the ink. An acrylate molecule having two or more acrylate functional groups may react with two or more other acrylate molecules and hence, a polymeric network may be formed. Examples of acrylates having two or more acrylate functional groups are known in the art.

In a further embodiment, the radiation-curable ink composition further comprises a monofunctional acrylate. Presence of a monofunctional acrylate may improve the hardness and flexibility of the ink layer after curing.

In an embodiment, an ink set is provided, wherein the ink set comprises a radiation-curable inkjet ink composition according to the present invention.

An ink set may comprise a plurality of different inks. For example, the ink set may be a CMYK ink set, comprising a Yellow, a Magenta, a Cyan and a blacK ink composition. At least one of the ink compositions in the ink set may be an ink comprising a gellant and further comprising a fatty alcohol ester of citric acid. Preferably, a plurality of the ink compositions in the ink set may be radiation-curable ink compositions according to the present invention. The ink set may further comprise additional colors, such as white, red, green, light magenta, light cyan and/or grey. Further, the ink set may comprise one or more metallic ink compositions. Optionally, the ink set may comprise an undercoat and/or an overcoat composition.

In an aspect of the invention a method for preparing an ink composition is provided, the method comprising the steps of:
  a. Providing a radiation-curable medium, a gelling agent and an amine acrylate oligomer, the amine acrylate oligomer being a reaction product between 2-aminoethanol and a diacrylate, the gellant being a condensation product of a first reactant and a second reactant, wherein the first reactant is a compound A comprising at least 3 first functional groups, and wherein the second reactant comprises at least one compound B, wherein the at least one compound B comprises a second functional group, wherein the first functional group is a first group selected from a hydroxyl functional group and a carboxylic acid functional group and the second functional group is a second group selected from a hydroxyl functional group and a carboxylic acid functional group, wherein the first functional group is different from the second functional group;
  b. Mixing the radiation-curable medium, the gelling agent and the amine acrylate oligomer.

The radiation-curable component, the gelling agent and the amine acrylate oligomer may be provided. Optionally, additional components may be provided, for example an additional solvent. The radiation-curable component and the gellant may be provided neat or they may be provided in a solution or dispersion. Optionally, a colorant may be provided. In case the colorant is a pigment, the pigment is preferably provided as a dispersion, such as an aqueous pigment dispersion. The components may be provided at once, or the components may be added subsequently. The components may be added in any suitable order. In case a dispersible component is added (e.g. a pigment), such dispersible component may be preferably added after the other components of the ink composition are provided. Mixing of the components may be carried out at any suitable temperature, for example room temperature.

In a further aspect of the invention, a method for printing on an adhesive medium is provided, the method comprising the steps of:
  a. Applying a radiation-curable ink onto the recording medium, the radiation-curable ink being a radiation-curable ink composition according to the present invention;
  b. Curing the ink composition.

In the method, an image is applied onto a recording medium. In the method, in step a), ink is applied onto the recording medium, thereby applying an image onto the recording medium. The ink composition may be applied onto the recording medium in a predetermined fashion, e.g. in accordance with image files stored on suitable storing means. The image may be applied for example by jetting droplets of the radiation-curable inkjet ink composition using an inkjet print head. The recording medium may be a sheet-like medium, such as a sheet of paper or a sheet of vinyl. Alternatively, the recording medium may be a web, for example an endless belt. The web may be made of a suitable material. The recording medium may be an adhesive medium. This type of medium may be used to adhere to an object. The medium may adhere using an adhesion means, such as glue. Preferably, the medium is a self-adhesive medium. A self-adhesive medium is a medium provided with adhesion means, such as glue. An example of a self-adhesive medium is a sticker. Self-adhesive media are convenient when the image printed on the recording medium is meant to be applied on an object.

In the method, in step b), the radiation-curable inkjet ink composition is cured. Curing of the ink may result in hardening of the ink layer. The hardened ink layer may be a robust layer.

When using the method according to the present invention, a printed product may be obtained that shows a decreased level of glue-interaction or does not show any glue-interaction at all.

In an embodiment, the step of curing the radiation-curable ink composition comprises irradiating the radiation-curable ink composition with radiation. The radiation may be suitable radiation, such as UV radiation, visible light radiation or electron beam radiation. UV radiation is preferred. The inkjet ink composition may be irradiated using a suitable source of radiation, such as a halogen lamp, a mercury lamp and/or a LED lamp. Optionally, a plurality of sources of radiation may be used to irradiate the inkjet ink composition.

In an embodiment, the adhesive medium is a self-adhesive vinyl medium. A self-adhesive medium may be suitably used in accordance with the present invention. Examples of commercially available self-adhesive vinyl media are MPI2000 form Avery Dennison.

In an aspect of the invention, a printed product is provided, the product comprising an adhesive medium provided with a printed layer, wherein the printed layer comprises an amine acrylate oligomer, the amine acrylate oligomer being a reaction product between 2-aminoethanol and a diacrylate. Preferably, the printed image is applied on a side of the adhesive medium opposite from the adhesive side of the medium. The printed product may be used to provide an object with an image. The adhesive side of the printed product may be applied onto the object.

In an embodiment, the ink layer is cured. The printed product provided with the cured printed layer is obtainable using the method according to the present invention.

In an aspect of the invention a method for applying an image onto an object is provided, the method comprising the steps of:
a. applying a printed product in accordance with the present invention onto the object.

BRIEF DESCRIPTION OF THE DRAWINGS

These and further features and advantages of the present invention are explained hereinafter with reference to the accompanying drawings showing non-limiting embodiments and wherein.

In the drawings, same reference numerals refer to same elements.

DETAILED DESCRIPTION OF THE DRAWINGS

Figure 1A:
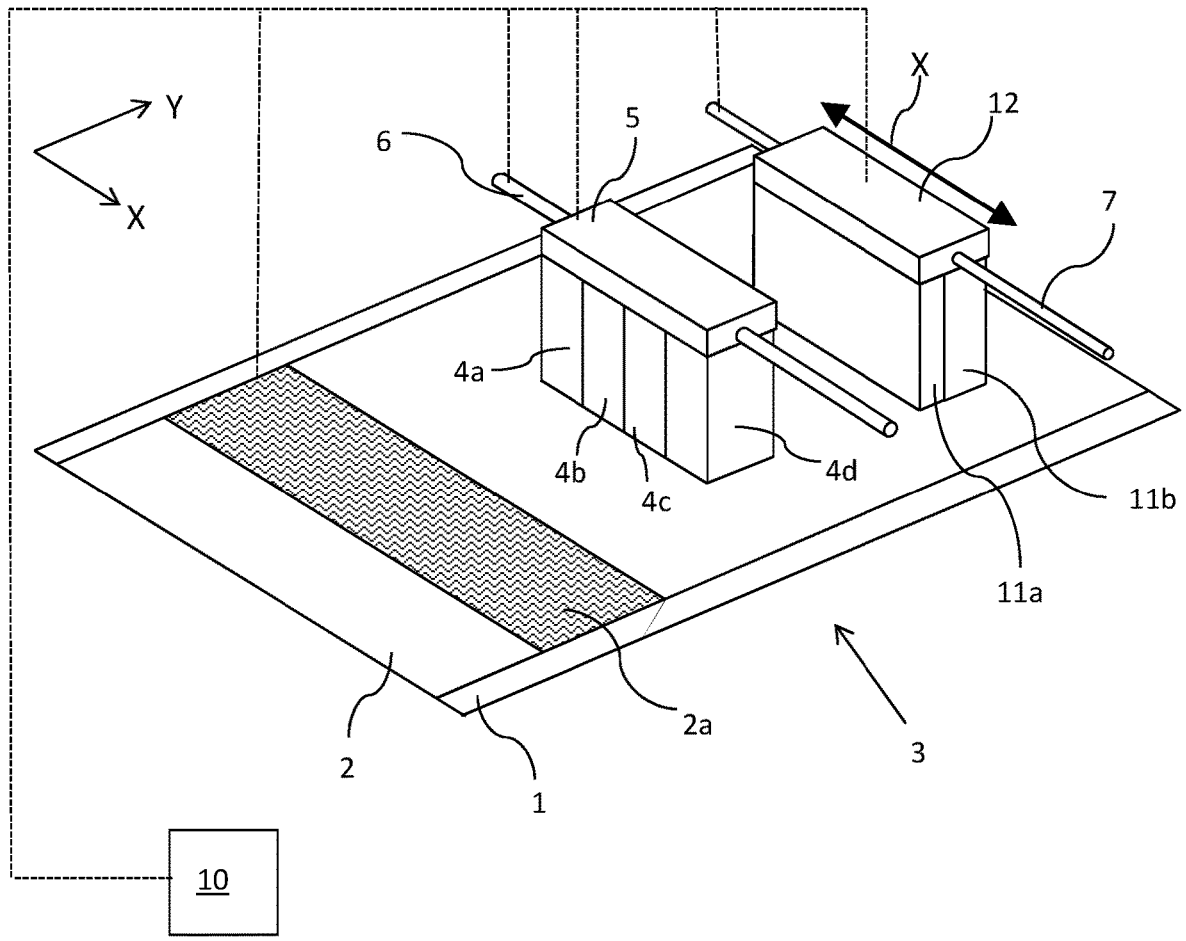
FIG. 1A shows a schematic representation of an inkjet printing system.
Figure 1B:
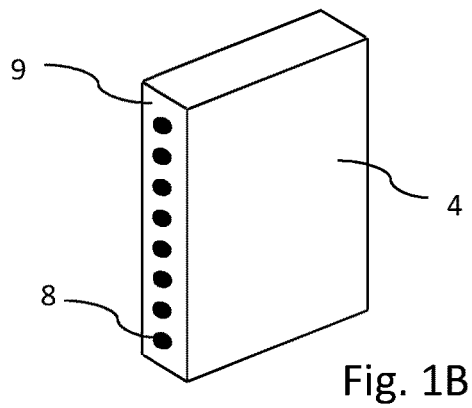
FIG. 1B shows a schematic representation of an inkjet print head.

FIG. 1A shows an ink jet printing assembly 3. The ink jet printing assembly 3 comprises supporting means for supporting an image receiving medium 2. The supporting means are shown in FIG. 1A as a flat surface 1, but alternatively, the supporting means may be a platen, for example a rotatable drum that is rotatable around an axis. The supporting means may be optionally provided with suction holes for holding the image receiving medium in a fixed position with respect to the supporting means. The ink jet printing assembly 3 comprises print heads 4a-4d, mounted on a scanning print carriage 5. The scanning print carriage 5 is guided by suitable guiding means 6 to move in reciprocation in the main scanning direction X. Each print head 4a-4d comprises an orifice surface 9, which orifice surface 9 is provided with at least one orifice 8, as is shown in FIG. 1B. The print heads 4a-4d are configured to eject droplets of marking material onto the image receiving medium 2.

The image receiving medium 2 may be a medium in web or in sheet form and may be composed of e.g. paper, cardboard, label stock, coated paper, plastic or textile. Alternatively, the image receiving medium 2 may also be an intermediate member, endless or not. Examples of endless members, which may be moved cyclically, are a belt or a drum. The image receiving medium 2 is moved in the sub-scanning direction Y over the flat surface 1 along four print heads 4a-4d provided with a fluid marking material.

The image receiving medium 2, as depicted in FIG. 1A is locally heated or cooled in the temperature control region 2a. In the temperature control region 2A, temperature control means (not shown), such as heating and/or cooling means may be provided to control the temperature of the receiving medium 2. Optionally, the temperature control means may be integrated in the supporting means for supporting an image receiving medium 2. The temperature control means may be electrical temperature control means. The temperature control means may use a cooling and/or heating liquid to control the temperature of the image receiving medium 2. The temperature control means may further comprise a sensor (not shown) for monitoring the temperature of the image receiving medium 2.

A scanning print carriage 5 carries the four print heads 4a-4d and may be moved in reciprocation in the main scanning direction X parallel to the platen 1, such as to enable scanning of the image receiving medium 2 in the main scanning direction X. Only four print heads 4a-4d are depicted for demonstrating the invention. In practice an arbitrary number of print heads may be employed. In any case, at least one print head 4a-4d per color of marking material is placed on the scanning print carriage 5. For example, for a black-and-white printer, at least one print head 4a-4d, usually containing black marking material is present. Alternatively, a black-and-white printer may comprise a white marking material, which is to be applied on a black image-receiving medium 2. For a full-color printer, containing multiple colors, at least one print head 4a-4d for each of the colors, usually black, cyan, magenta and yellow is present. Often, in a full-color printer, black marking material is used more frequently in comparison to differently colored marking material. Therefore, more print heads 4a-4d containing black marking material may be provided on the scanning print carriage 5 compared to print heads 4a-4d containing marking material in any of the other colors.

Alternatively, the print head 4a-4d containing black marking material may be larger than any of the print heads 4a-4d, containing a differently colored marking material.

The carriage 5 is guided by guiding means 6. These guiding means 6 may be a rod as depicted in FIG. 1A. Although only one rod 6 is depicted in FIG. 1A, a plurality of rods may be used to guide the carriage 5 carrying the print heads 4. The rod may be driven by suitable driving means (not shown). Alternatively, the carriage 5 may be guided by other guiding means, such as an arm being able to move the carriage 5. Another alternative is to move the image receiving material 2 in the main scanning direction X.

Each print head 4a-4d comprises an orifice surface 9 having at least one orifice 8, in fluid communication with a pressure chamber containing fluid marking material provided in the print head 4a-4d. On the orifice surface 9, a number of orifices 8 are arranged in a single linear array parallel to the sub-scanning direction Y, as is shown in FIG. 1B. Alternatively, the nozzles may be arranged in the main scanning direction X. Eight orifices 8 per print head 4a-4d are depicted in FIG. 1B, however obviously in a practical embodiment several hundreds of orifices 8 may be provided per print head 4a-4d, optionally arranged in multiple arrays.

As depicted in FIG. 1A, the respective print heads 4a-4d are placed parallel to each other. The print heads 4a-4d may be placed such that corresponding orifices 8 of the respective print heads 4a-4d are positioned in-line in the main scanning direction X. This means that a line of image dots in the main scanning direction X may be formed by selectively activating up to four orifices 8, each of them being part of a different print head 4a-4d. This parallel positioning of the print heads 4a-4d with corresponding in-line placement of the orifices 8 is advantageous to increase productivity and/or improve print quality. Alternatively multiple print heads 4a-4d may be placed on the print carriage adjacent to each other such that the orifices 8 of the respective print heads 4a-4d are positioned in a staggered configuration instead of in-line. For instance, this may be done to increase the print resolution or to enlarge the effective print area, which may be addressed in a single scan in the main scanning direction X. The image dots are formed by ejecting droplets of marking material from the orifices 8.

The ink jet printing assembly 3 may further comprise curing means 11a, 11b. As shown in FIG. 1A, a scanning print carriage 12 carries the two curing means 11a, 11b and may be moved in reciprocation in the main scanning direction X parallel to the platen 1, such as to enable scanning of the image receiving medium 2 in the main scanning direction X. Alternatively, more than two curing means may be applied. It is also possible to apply page-wide curing means. If page-wide curing means are provided, then it may not be necessary to move the curing means in reciprocation in the main scanning direction X. The first curing means 11a may emit a first beam of UV radiation, the first beam having a first intensity. The first curing means 11a may be configured to provide the radiation for the pre-curing step. The second curing means 11b may emit a second beam of radiation, the second beam of radiation having a second intensity. The second curing means 11b may be configured to provide the radiation for the post-curing step.

The carriage 12 is guided by guiding means 7. These guiding means 7 may be a rod as depicted in FIG. 1A. Although only one rod 7 is depicted in FIG. 1A, a plurality of rods may be used to guide the carriage 12 carrying the print heads 11. The rod 7 may be driven by suitable driving means (not shown). Alternatively, the carriage 12 may be guided by other guiding means, such as an arm being able to move the carriage 12.

The curing means may be energy sources, such as actinic radiation sources, accelerated particle sources or heaters. Examples of actinic radiation sources are UV radiation sources or visible light sources. UV radiation sources are preferred, because they are particularly suited to cure UV curable inks by inducing a polymerization reaction in such inks. Examples of suitable sources of such radiation are lamps, such as mercury lamps, xenon lamps, carbon arc lamps, tungsten filaments lamps, light emitting diodes (LED's) and lasers. In the embodiment shown in FIG. 1A, the first curing means 11a and the second curing means 11b are positioned parallel to one another in the sub scanning direction Y. The first curing means 11a and the second curing means 11b may be the same type of energy source or may be different type of energy source. For example, when the first and second curing means 11a, 11b, respectively both emit actinic radiation, the wavelength of the radiated emitted by the two respective curing means 11a, 11b may differ or may be the same. The first and second curing means are depicted as distinct devices. However, alternatively, only one source of UV radiation emitting a spectrum of radiation may be used, together with at least two distinct filters. Each filter may absorb a part of the spectrum, thereby providing two beams of radiation, each one having intensity different from the other.

The flat surface 1, the temperature control means, the carriage 5, the print heads 4a-4d, the carriage 12 and the first and second curing means 11a, 11b are controlled by suitable controlling means 10.

Experiments and Examples

Materials

CN3715, CN3755, SR 420, SR606A and CN2305 were obtained from Sartomer. Genomer 5161 and Speedcure ITX were obtained from Rahn. Tegorad 2250 was obtained from Evonik. Pentaerythritoltetrastearate was obtained from NOF as WE-6. Magenta pigment was obtained from Sun. Irgacure 819 was obtained from IGM resins. Phenothiazine was obtained from Sigma Aldrich. Etercure 6113 was obtained from Eternal Materials. All chemicals were used as received.

Methods

Rodcoats

Rodcoats were made by applying a 12 μm thick layer of ink onto a receiving medium. As receiving medium, Avery Dennison MPI2000 was used. MPI2000 is a self-adhesive vinyl medium.

The ink was cured by irradiating the ink layer using a Phoseon Fire Power FP300 LED lamp, having a window size of 225×20 mm and emitting radiation having a wavelength of 395 nm. The lamp was positioned 35 cm above the moving belt. The peak irradiance, measured at 395 nm, at 100% output and at a height of 3 cm above the moving belt, was 16 Wcm$^{-2}$.

The lamp was operated at variable power level. The rodcoats were transported under the lamp 4 times at a speed of 7.4 m/min using a moving belt.

Glue Interaction

One rodcoat was prepared. The backing of a piece of blank Avery Dennison MPI 2000 was removed and the MPI2000 was placed with the glue side on top of the printed side of the rodcoat. The package was left for one hour and subsequently the blank MPI 2000 was removed. The removability was tested (easy to remove or difficult to remove) as well as the condition of the print that was covered by the blank MPI2000.

Comparison Experiment

Example and Comparative Examples

Ink compositions Ex 1, CE 1 and CE 2 were prepared by providing the components shown in table 1 in the amount shown in table 1 and mixing the components.

The first ink composition is ink composition Ex 1, which is an ink composition according to the present invention.

The second ink composition is ink composition CE 1, which is an ink composition not according to the present invention. The third ink composition is ink composition CE 2, which is also an ink composition not according to the present invention.

TABLE 1

| Component | Ex 1 | CE 1 | CE 2 |
|---|---|---|---|
| CN3755 | 10.09 | 0.00 | 0.00 |
| CN3715 | 0.00 | 10.09 | 0.00 |
| Genomer 5161 | 0.00 | 0.00 | 10.09 |
| Tegorad 2250 | 0.69 | 0.69 | 0.69 |
| pentaerythritoltetrastearate | 0.69 | 0.69 | 0.69 |
| Phenothiazine | 0.07 | 0.07 | 0.07 |
| Irgacure 819 | 0.98 | 0.98 | 0.98 |
| Speedcure ITX | 3.72 | 3.72 | 3.72 |
| magenta pigment | 16.40 | 16.40 | 16.40 |
| SR420 | 44.03 | 44.03 | 44.03 |
| SR606A | 6.67 | 6.67 | 6.67 |
| Etercure 6113 | 13.33 | 13.33 | 13.33 |
| CN2305 | 3.33 | 3.33 | 3.33 |
| Total | 100.00 | 100.00 | 100.00 |

Glue interaction tests were performed by testing the removability and condition of print for rodcoats made using ink compositions Ex 1 and CE 1. The results are summarized in table 2.

TABLE 2

| | Glue interaction | |
|---|---|---|
| Ink compositions | removability | Condition of print |
| Ex 1 | easy to remove | slightly damaged |
| CE 1 | difficult to remove | ink layer completely removed |
| CE 2 | difficult to remove | ink layer completely removed |

Rodcoats prepared using ink compositions Ex 1, CE 1 and CE 2 respectively, were tested for removability and condition of the print. The following was observed. Removal of the self-adhesive medium from the rodcoat was easy for rod coats made with ink composition Ex 1, which is an ink composition according to the present invention. Removal of the self-adhesive medium from the rodcoat for rod coats made with ink composition CE 1 or CE 2 on the other hand, was difficult, Rod coats made with ink composition Ex 1—which is an ink composition according to the present invention-resulted in slightly damaged prints after removal of the self-adhesive medium. Rod coats made with ink composition CE 1 and CE 2, on the other hand, resulted in complete removal of the ink layer after removal of the self-adhesive medium.

Thus, thus, rodcoats made using ink composition Ex 1 showed better results for both removability and condition of print than rodcoats made using ink composition CE 1 and CE 2.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed. Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention claimed is:

1. A radiation-curable ink composition, the radiation-curable ink composition comprising at least a radiation-curable medium, a gelling agent and an amine acrylate oligomer, the amine acrylate oligomer being a reaction product between 2-aminoethanol and a diacrylate, the gelling agent being a condensation product of a first reactant and a second reactant, wherein the first reactant is a compound A comprising at least 3 first functional groups, and wherein the second reactant comprises at least one compound B, wherein the at least one compound B comprises a second functional group, wherein the first functional groups are a first group selected from a hydroxyl functional group and a carboxylic acid functional group and the second functional group is a second group selected from a hydroxyl functional group and a carboxylic acid functional group, wherein the first functional groups are different from the second functional group;

wherein the gelling agent is present in an amount of 0.05 wt % to 4.0 wt % based on the total weight of the radiation-curable ink composition.

2. The radiation-curable ink composition according to claim 1, wherein the diacrylate is a component according to the formula $H_2CCHC(O)O(CH_2)_nOC(O)CHCH_2$, wherein n is an integer in the range of 3-10.

3. The radiation-curable ink composition according to claim 2, wherein the diacrylate is 1,6-hexanediacrylate.

4. The radiation-curable ink composition according to claim 1, wherein the amine acrylate oligomer comprises at least one hydroxyl group.

5. The radiation-curable ink composition according to claim 1, wherein the gelling agent is a fatty acid ester obtainable by a condensation reaction between a fatty acid and a component selected from the group consisting of pentaerythritol, cyclodextrine, glycerol, dipentaerythritol, 2-(hydroxymethyl)-2-methylpropane-1,3-diol, 2-ethyl-2-(hydroxymethyl) propane-1,3-diol, 2-(hydroxymethyl) propane-1,3-diol, trimethylolethane, trimethylolpropane, trimethylolbutane and trimethylolpentane.

6. An ink set comprising a radiation-curable inkjet ink composition according claim 1.

7. A method for preparing an ink composition, the method comprising the steps of:

a) providing a radiation-curable medium, a gelling agent and an amine acrylate oligomer, the amine acrylate oligomer being a reaction product between 2-aminoethanol and a diacrylate, the gelling agent being a condensation product of a first reactant and a second reactant, wherein the first reactant is a compound A comprising at least 3 first functional groups, and wherein the second reactant comprises at least one compound B, wherein the at least one compound B comprises a second functional group, wherein the first functional groups are a first group selected from a hydroxyl functional group and a carboxylic acid functional group and the second functional group is a second group selected from a hydroxyl functional group and a carboxylic acid functional group, wherein the first functional groups are different from the second functional group;

b) mixing the radiation-curable medium, the gelling agent and the amine acrylate oligomer;

wherein the gelling agent is present in an amount of 0.05 wt % to 4.0 wt % based on the total weight of the ink composition.

8. A method for printing on an adhesive medium, the method comprising the steps of:

a) applying a radiation-curable ink onto the recording medium, the radiation-curable ink composition being an ink composition according to claim 1;

b) curing the radiation-curable ink composition.

9. The method according to claim 8, wherein the step of curing the radiation-curable ink composition comprises irradiating the radiation-curable ink composition with radiation.

10. The method according to claim 8, wherein the adhesive medium is a self-adhesive vinyl medium.

11. A printed product, the product comprising an adhesive medium provided with a printed layer, wherein the printed layer comprises radiation-curable ink composition according to claim 1.

12. The printed product according to claim 11, wherein the ink layer is cured.

13. A method for applying an image onto an object, the method comprising the steps of:

a) applying a printed product according to claim 11 onto the object.

* * * * *